US009191336B2

(12) United States Patent
Arya et al.

(10) Patent No.: US 9,191,336 B2
(45) Date of Patent: Nov. 17, 2015

(54) METHOD AND APPARATUS FOR DATA TRAFFIC DISTRIBUTION AMONG INDEPENDENT PROCESSING CENTERS

(71) Applicant: The DIRECTV Group, Inc., El Segundo, CA (US)

(72) Inventors: Vishal Arya, Manhattan Beach, CA (US); Shahzad Ali, El Segundo, CA (US); Christopher J. Cugno, Anaheim, CA (US); Thai Lam, Torrance, CA (US); Michael A. Makhijani, Playa Vista, CA (US); Vaibhav Singh, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 126 days.

(21) Appl. No.: 13/682,704

(22) Filed: Nov. 20, 2012

(65) Prior Publication Data
US 2014/0143423 A1 May 22, 2014

(51) Int. Cl.
G06F 15/173 (2006.01)
H04L 12/911 (2013.01)

(52) U.S. Cl.
CPC .................................... H04L 47/70 (2013.01)

(58) Field of Classification Search
USPC .......................... 709/217, 218, 219, 226, 238
See application file for complete search history.

(56) References Cited

U.S. PATENT DOCUMENTS

| 7,299,361 | B1 | 11/2007 | Kim et al. | |
|---|---|---|---|---|
| 8,095,681 | B2 * | 1/2012 | Yumoto et al. | 709/232 |
| 8,412,764 | B1 * | 4/2013 | Liskov et al. | 709/201 |
| 2006/0112170 | A1 * | 5/2006 | Sirkin | 709/217 |
| 2006/0242300 | A1 * | 10/2006 | Yumoto et al. | 709/226 |
| 2007/0198656 | A1 * | 8/2007 | Mazzaferri et al. | 709/218 |
| 2009/0260014 | A1 | 10/2009 | Cameron | |
| 2010/0131946 | A1 | 5/2010 | Degaonkar et al. | |
| 2010/0223364 | A1 * | 9/2010 | Wei | 709/220 |
| 2010/0299437 | A1 * | 11/2010 | Moore | 709/226 |
| 2012/0124165 | A1 | 5/2012 | Richardson et al. | |
| 2012/0166650 | A1 * | 6/2012 | Davis et al. | 709/226 |
| 2012/0230194 | A1 | 9/2012 | Matthews et al. | |

OTHER PUBLICATIONS

International Search Report and Written Opinion dated Mar. 27, 2014 in International Application No. PCT/US2013/068573 filed Nov. 5, 2013.

* cited by examiner

Primary Examiner — Liangche A Wang

(57) ABSTRACT

A method and apparatus for assigning processing requests is disclosed. The method is typically used in a processing system comprising a first processing center and one or more second processing centers remote from the first processing center, a. A method of assigning a processing request may comprise the steps of: determining at a traffic distribution controller a capacity of each of the processing centers to process the processing request, accepting a processing request in the first processing center, and assigning the processing request to at least one of the second processing centers according to the determined current capacity of each of the processing centers. The processing request is initially addressed to a first global address of the first processing center, then the processing request is readdressed to a second global address of one of the second processing centers.

22 Claims, 8 Drawing Sheets

METHOD AND APPARATUS FOR DATA TRAFFIC DISTRIBUTION AMONG INDEPENDENT PROCESSING CENTERS

BACKGROUND

1. Field of the Invention

The present disclosure relates generally to data processing services, and more specifically, to data traffic distribution among independent processing centers.

2. Technical Background

The electronic information service industry can be described in terms of client entities and server entities (though these roles are not mutually exclusive) joined by a computer network. Typically, the server entity (or "service provider") offers processing services, such as data management/storage/retrieval, data configuration/manipulation, assessment/analysis, publication/distribution, monitoring/reporting/control, etc. To access the processing services of a server entity, client entities transmit processing requests (which may or may not include data) over the network for receipt and handling by a service entity. The service entity will typically be a business organization with its own primary processing center (sometimes referred to as a data center or data service center) including computing resources (e.g., servers, processors, memory, databases, software applications, etc.) configured to provide the given service(s). The client entity may be, for example, a private individual or another business organization with local computing resources (e.g., a smartphone, mobile device, personal computer, set top box, server, etc.) with application software configured to transmit processing requests as a client.

Consider the example of an organization operating as a service provider in a subscriber-based media distribution business. The number of incoming processing requests to such an organization's primary processing center can vary widely during the day. Such processing requests can come from client entities such as existing customers, potential new customers, employees, and business partners. To assure that incoming processing requests are serviced without bothersome delay (e.g., to avoid angering current customers and deterring potential customers), the primary processing center may be expanded to handle the increased data traffic and processing load requirements that are presented at peak hours. However, designing the organization's primary processing center to meet such requirements is often prohibitively expensive and inefficient, since the capacity is not needed most of the time.

Instead, many such service provider organizations now employ third party (3P) point-of-presence (POP) processing center solutions. The 3P-POP processing centers replicate the functions of the organization's primary processing center in a virtualized environment, in which the data platform and infrastructure is delivered to the organization as a service for a fee. Such 3P-POP processing center solutions typically involve a vendor that is commercially distinct from the customer-facing organization, and under contract or agreement to provide the required processing service for the organization as directed, typically when incoming processing requests exceed the capacity of the organization's primary processing center.

One problem with the use of such 3P-POP processing centers is that the 3P-POP processing centers themselves can be overwhelmed with client requests for data or information, and as a consequence, customers, employees and business partners may still experience significant delays in processing service. The organization may contract with multiple 3P-POP processing centers to provide support, but that is of little help unless the organization's primary processing center can allocate processing requests to 3P-POP processing centers that can handle the increased load. Further, since 3P-POP processing centers often support overflow processing requests from more than one organization, the ability of the 3P-POP processing centers to handle the additional load depends on factors that are not within the control of the organization.

Additionally, 3P-POP processing centers are designed, owned, and controlled by third parties, and as such, often cannot easily communicate with the organization's primary processing center because of incompatible vendors or the equipment that is used to build the processing center itself. This lack of compatibility prevents feedback or other communication between the organization's primary processing center and the 3P-POP processing centers, which limits the ability to manage the traffic being directed between the organization's primary processing center and the 3P-POP processing centers. What is needed is a traffic distribution system that operates well within disparate environments such as those including 3P-POP processing centers, where there is no feedback provided from the 3P-POP processing center to the organization's processing center.

SUMMARY

A method and apparatus for data traffic distribution among independent processing centers are disclosed. In one or more embodiments, a method of assigning processing requests may be implemented in a processing system comprising a first processing center and one or more second processing centers remote from the first processing center. The method of assigning processing requests may comprise: determining, at a traffic distribution controller, a current capacity of each of the processing centers to process a processing request; receiving a processing request in the first processing center; and assigning the processing request to at least one of the second processing centers according to the determined current capacity of each of the processing centers, wherein the processing request is addressed to a first global address. The method may further comprise readdressing the processing request from the first global address to a second global address of one of the second processing centers.

In one or more embodiments, the data traffic distribution apparatus may be implemented in a processing system comprising: a first processing center, for accepting a processing request; one or more second processing centers remote from the first processing center; and a traffic distribution controller, disposed external to the one or more second processing centers, for determining a capacity of each of the processing centers to process the processing request and for assigning the processing request to at least one of the second processing centers according to the determined current capacity of each of the processing centers. The traffic distribution controller may assign the processing request by readdressing the processing request from a first global address to a second global address of one of the second processing centers.

BRIEF DESCRIPTION OF THE DRAWINGS

Referring now to the drawings in which like reference numbers represent corresponding parts throughout.

DETAILED DESCRIPTION

Third party POP (3P-POP) processing centers can help organizations grow in a very short span of time and can be used to build resiliency and fault tolerance in a processing center infrastructure; however, current traffic distribution solutions are not capable of working in a multi-vendor environment favoring the third party POPs. The apparatus and methods disclosed herein provide a solution that removes this limitation and hence can work well even in a 3P-POP environment.

In the following description, reference is made to the accompanying drawings which form a part hereof, and which is shown, by way of illustration, several example embodiments. It is understood that other embodiments may be utilized and structural changes may be made without departing from the scope of the present disclosure.

Distribution System

Figure 1:
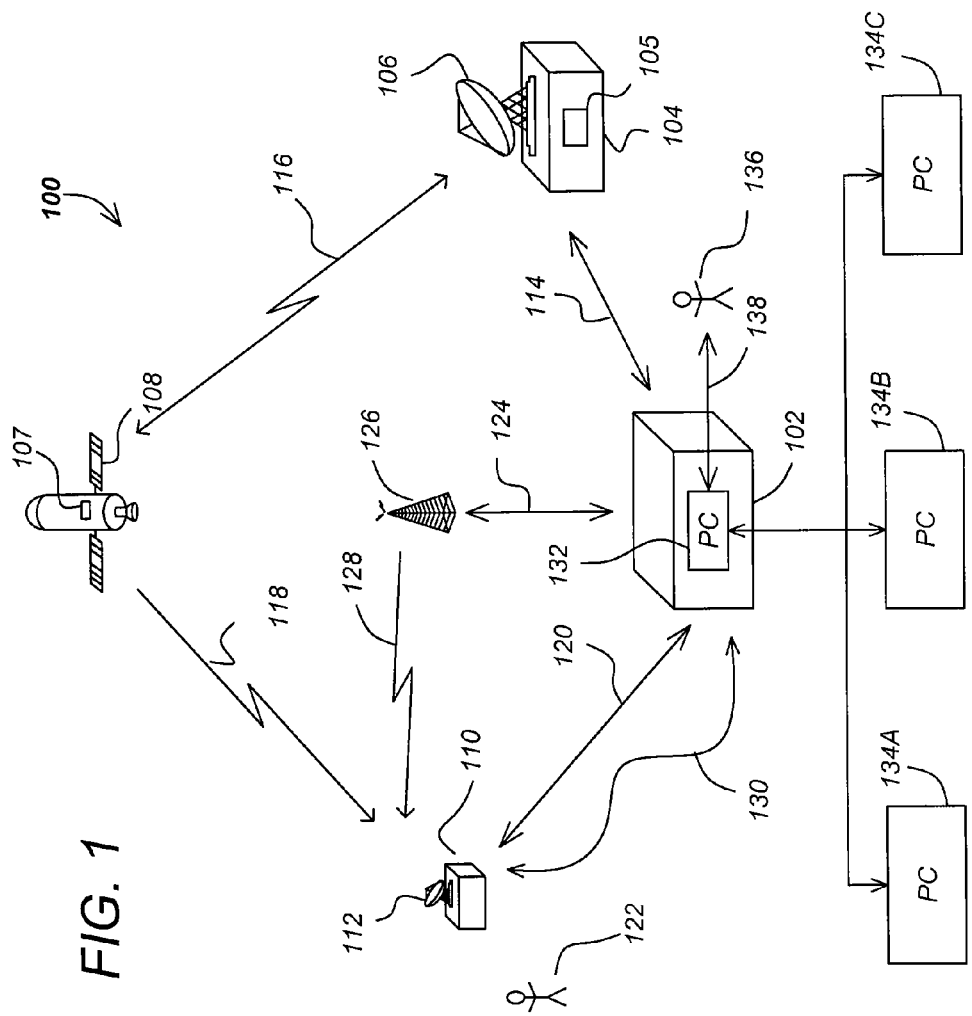
FIG. 1 is a diagram illustrating an overview of an example embodiment of a distribution system that can be used to provide video data, software updates, and other data to subscribers.

FIG. 1 is a diagram illustrating an overview of an example embodiment of a distribution system 100 that can be used to provide data such as media programs, video data, software and software updates, and other data and services from a service provider to subscribers (clients).

The distribution system 100 comprises a service provider's control center 102 in communication with an uplink center 104 via a ground or other link 114 and with a receiver station 110 of a subscriber (client) 122 via communications link 120, which may include the public switched telephone network (PSTN), or Internet connection. The control center 102 may provide program material (e.g. video programs, audio programs, software updates, and other data) directly to the subscriber via communications link 120, by cable transmission 130, by terrestrial transmission via communications link 124 to terrestrial transmitter 126 and thereafter to the subscriber receiver station or client 110 (e.g., via link 128), or to the uplink center 104 for transmission to the receiver station 110 via satellite 108 as further described below. The control center 102 also coordinates with the subscriber receiver stations 110 to offer, for example, pay-per-view (PPV) program services, including video selection, billing and conditional access functions.

In embodiments using satellite transmission, the uplink center 104 receives program material and program control information from the control center 102, and, using an uplink antenna 106 and transmitter 105, transmits the program material and program control information to the satellite 108. The satellite receives and processes this information, and transmits the video programs and control information to the subscriber receiver station 110 via downlink 118 using one or more transponders 107 or transmitters. The subscriber receiver station 110 receives this information using the outdoor unit (ODU) 112, which may include, for example, a subscriber antenna (dish) and a low noise block converter (LNB). The distribution system 100 may include multiple satellites 108 in order to provide wider geographical coverage, to provide additional channels, or to provide additional bandwidth per channel.

The control center 102 also comprises one or more first processing center(s) 132 which respond to processing requests from the receiver station 110, from other distribution system 100 elements, or from other entities 136 such as new customers, partners or employees via external (or internal) communications link 138.

As described above, the first processing center 132 may be incapable of servicing incoming processing requests (e.g., pay-per-view requests, account management requests, etc.) in an adequately expeditious manner. To handle incoming processing requests, the first processing center 132 may refer the incoming processing request to one or more additional processing centers 134A-134C (hereinafter referred to as second processing center(s)), such as the 3P-POP processing centers described above.

Figure 2:
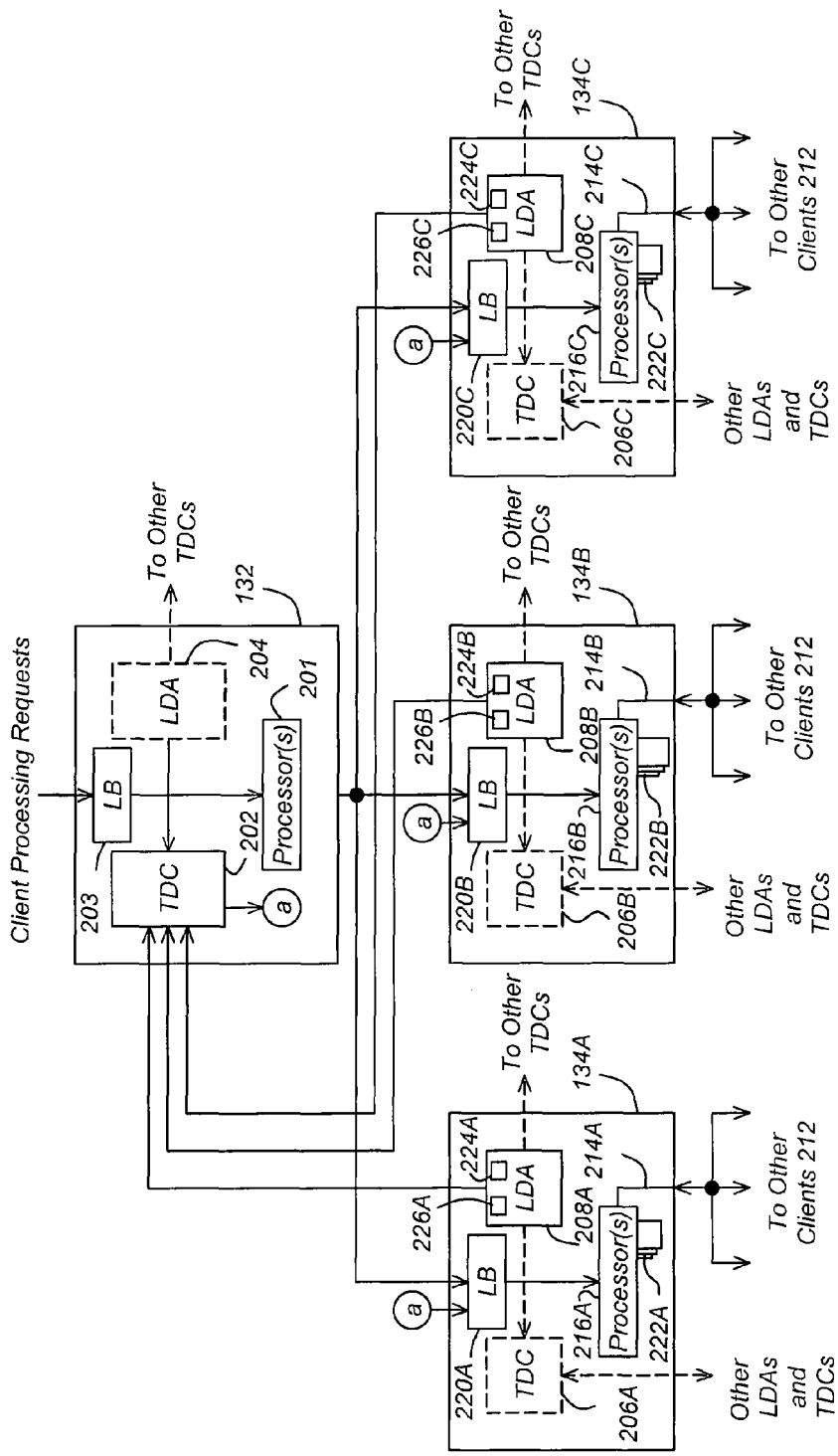
FIG. 2 is a diagram further illustrating the interoperation of the processing centers in an example embodiment.

FIG. 2 is a diagram further illustrating the interoperation of the processing centers 132, 134 of one embodiment. In the illustrated embodiment, the first processing center 132 comprises one or more processors 201 for performing client processing requests. The first processing center 132 may comprise a load balancer 203 that accepts the processing requests and routes each processing request (or, optionally, a group of requests, e.g., in a batch-based assignment/routing scheme) to an appropriate processor 201 based upon the capacity and load of each processor 201. In the illustrated embodiment, the first processing center 132 also comprises a traffic distribution controller (TDC) 202 that manages the routing of client processing requests (or, optionally, groups of requests) among the processing centers 132, 134A-134C, and in one embodiment, processors 201, 216A-216C within each processing center 132, 134A-134C as described further below. The TDC 202 is communicatively coupled to a respective load balancer (220A-220C) disposed at each of the processing centers, each of which operate to route processing requests to the appropriate processor 216A-216C within each second processing center 134A-134C (hereinafter alternatively referred to as second processing center(s) 134).

Each of the second processing centers 134 includes a respective load determining agent (LDA) 208A-208C (hereinafter alternatively referred to as LDA(s) 208) executing within the second processing center 134, typically on a processor (not illustrated) disposed in the second processing center 134 different than processors 216A-216C (hereinafter alternatively referred to as processors(s) 216). The load determining agent 208 performs tasks similar to some of the tasks of the load balancers 203, 220 described above. Namely, each LDA 208 determines the current processing load of its associated second processing center 134. In one embodiment, this is accomplished using measured value(s) of one or more processing parameters.

The LDA 208 is responsible for checking the current load of a processing center or processing site. Each LDA 208 interacts with the TDC 202, which receives all the load information from the LDAs 208(A-C) at different second processing centers 134(A-C) and executes the traffic distribution decisions. The LDAs 208 report the determined load of each of the second processing centers to the TDC 202, so that the processing load of each second processing center 134 is made available to the first processing center 132. The TDC 202 in the first processing center 132 determines a capacity of the each of the second processing centers 134 to process client processing requests received in the first processing center 132. This is computed from the processing load information received from each LDA 208.

In one embodiment, the capacity of each processing center 132, 134 to process a processing request is based on the current resource health of a processing center 134 as determined by a comparison of a current "load" of the given processing center, represented by a set of one or more measured values for one or more respective processing parameters, and a "limit," represented by a set of corresponding threshold value(s) for the one or more processing parameters.

Accordingly, the TDC 202 provides the intelligence to distribute processing request traffic based on load metrics collected by the LDAs 208. The TDC 202 allows traffic distribution among multiple data processor environments, including those of different vendors and different operating systems. In one embodiment, the TDC 202 uses domain name service (DNS) techniques to implement traffic distribution, as further described below. The TDC 202 and LDAs 208 may include LINUX based processors that can be customized to suit the needs of the distribution system 100. Beneficially, the use of TDC 202 and LDAs 208 allows the system to operate independent of a particular vendor's implementation of the processing center 134. The mechanisms used for data aggregation and traffic intelligence do not require interactions specific to a vendor.

In one embodiment, the first processing center 132 represents the primary processing center for responding to client processing requests and the second processing centers 134 operate as secondary processing centers. As such, client processing requests typically are forwarded from the first processing center 132 to one or more of the second processing centers 134, if the first processing center 132 cannot adequately or best perform a client processing request (for example, when the first processing center is incapable of performing the client processing request at all, incapable of performing it within a particular performance constraint such as response time, or unable to perform it as well as the one or more second processing centers 134 available to process the processing request). However, this need not be the case, as any of the processing centers 132, 134 may be called upon to perform the duties of a primary processing center or a secondary processing center, or the processing centers 132, 134 could operate as peers, with no processing center 132, 134 specifically designated as a primary or a secondary processing center.

FIG. 2 also illustrates that one or more of the second processing centers 134A-134C may also include an associated TDC 206A-206C which accepts information from LDAs in other processing centers 132, 134. Further, the first processing center 132 may include an LDA 204 that transmits information to other TDCs 206. These additional elements can operate as a back-up to the baseline systems described above, or can share duties to minimize processing load.

Figure 3:
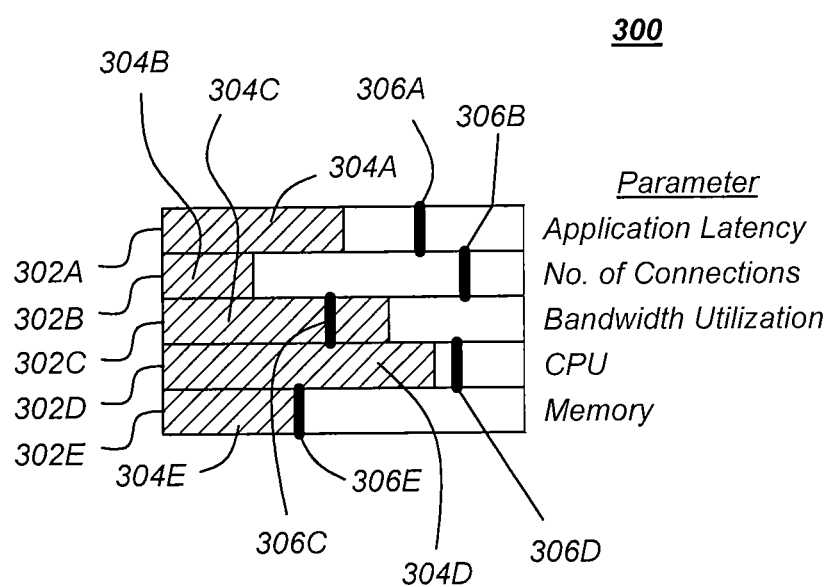
FIG. 3 is a diagram illustrating an example embodiment of measured processing parameters and limits.
Figure 4:
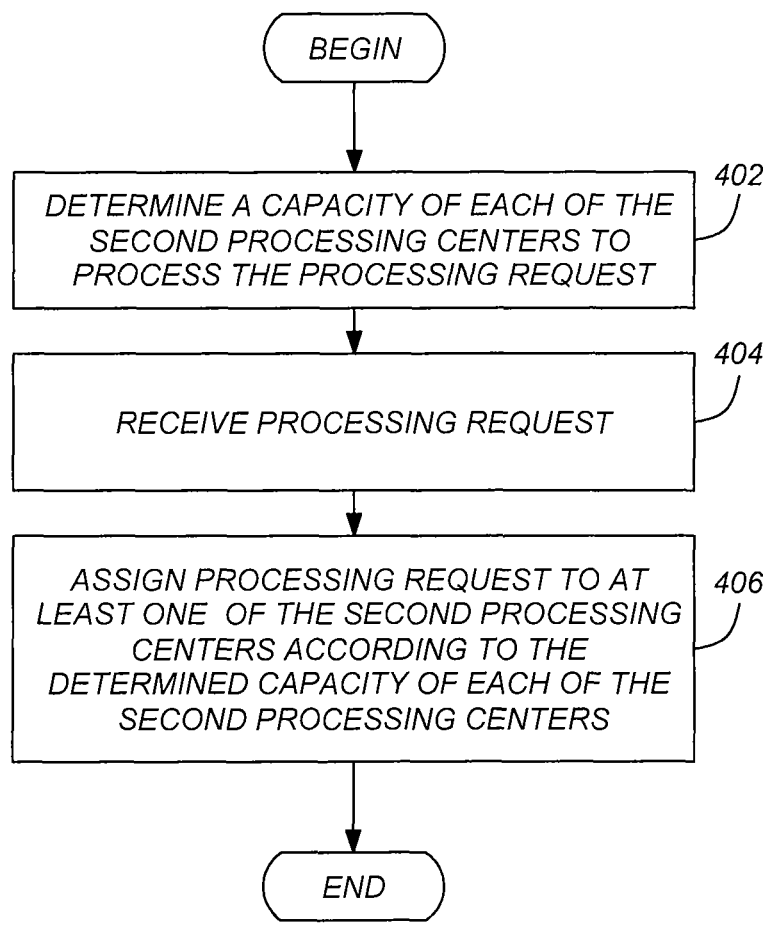
FIG. 4 is a flow diagram illustrating an example embodiment of a process for assigning processing requests.

FIG. 3 is a diagram illustrating an example embodiment of processing parameters 302, measurement values 304A-304E (representing the current "load") and threshold values 306A-306E (representing the "limit" set). In the illustrated embodiment, the processing parameters 302 include: "application latency" 302A, "number of connections" 302B, "bandwidth utilization" 302C, "CPU" utilization 302D, and "memory" utilization 302E. As shown in FIG. 4, each of these processing parameters 302 is associated with a measured value 304A-304E from data obtained by the respective LDA 208, and each of the measured values 304A-304E may be compared to an associated threshold value 306A-306E to determine the capacity of the given processing center (e.g., 132 or one of 134A-134C). Although the LDAs 208 may report data to the TDC 202 on a continuous basis, such information may also be provided on a periodic or aperiodic basis. In any case, the capacity of the processing centers (132, 134A-134C) to respond to client processing requests is preferably computed at intervals sufficient to track any variance of the measured values of the processing parameters.

In one embodiment, the LDAs 208 comprise a monitoring module 224, which polls applications 222(A-C) executing in the processing center 134 or its processors 216, and a processing load module 226, which determines the processing load of its associated processing center 134 using the polled or monitored information. Hence, values (304A-304E) for processing parameters 302(A-E) may be measured in each processing center (132, 134) by polling applications executing in the processing center (132, 134) and generating the processing "load" of each of the processing centers from the respective poll responses.

For example, "application latency" parameter 302A may be measured by transmitting a test request to one or more applications executing in the processing center (134) and measuring the time interval required for the executing application to respond to the transmitted test request. In one embodiment, application latency may be measured in terms of milliseconds, with a corresponding threshold value 306A of 100 ms, for example.

The "number of connections" parameter 302B can be measured, for example, by establishing a secure remote login between the LDA 204 and a given processing center (132, 134), and reading the number of clients currently serviced by that processing center. The number of connections may be specified in terms of the number of concurrent connections, and may be associated with a threshold value 306B of 100,000 concurrent connections, for example.

The processing centers (132, 134) may also include network devices, such as routers and modems that interface to other clients or processing centers. The "bandwidth utilization" parameter 302C may be measured by monitoring this network equipment to determine the throughput of the output and/or input data that is passed by these network devices. This parameter may be specified in terms of gigabits per second (Gbps) and may be associated with a threshold value 306C of 10 Gbps, for example.

The "memory" utilization parameter 302E may be determined by establishing a secure login to the processing center (132, 134) and using a utility analogous to a task manager (as found in WINDOWS operating systems) to determine and measure the memory utilization. Such memory utilization may include RAM or ROM, paging or any other memory measure, and can be expressed as a percent of the maximum available memory or a number of gigabytes (GB).

Similarly, the "CPU" processing utilization parameter may be determined by establishing a secure "remote" login to the processing center 134 and reading the processing utilization from the same or similar utility executing in the processing center (132, 134). This parameter may also be specified in terms of a percent of maximum capacity or a number of operations or pages per second.

FIG. 4 is a flow diagram illustrating an example embodiment of a process for assigning processing requests. The capacity of each of the second data processing centers 134 to respond to a processing request is determined, as shown in block 402. After a processing request is received, as shown in block 404, the processing request is assigned to at least one of the second processing centers 134(A-C) according to the determined capacity of the second processing centers, as shown in block 406. It is noted that although the diagram of FIG. 4 depicts that the capacity of the second processing centers 134 is determined before the processing request is received, this need not be the case. Generally, the capacity is determined on an ongoing basis, and the processing request is assigned after it is received using the latest capacity information. Alternatively, the processing request itself may trigger the TDC 202 to determine that capacity of the second processing centers 134.

In one embodiment, the processing request is received in the first processing center 132, the capacity is determined by the TDC 202 of the first processing center 132, and the assignment of the processing request to one of the processing centers 134 is accomplished by the TDC 202. Assignment to specific processors 216 within the processing centers 134 is also possible as described further below.

Figure 5:
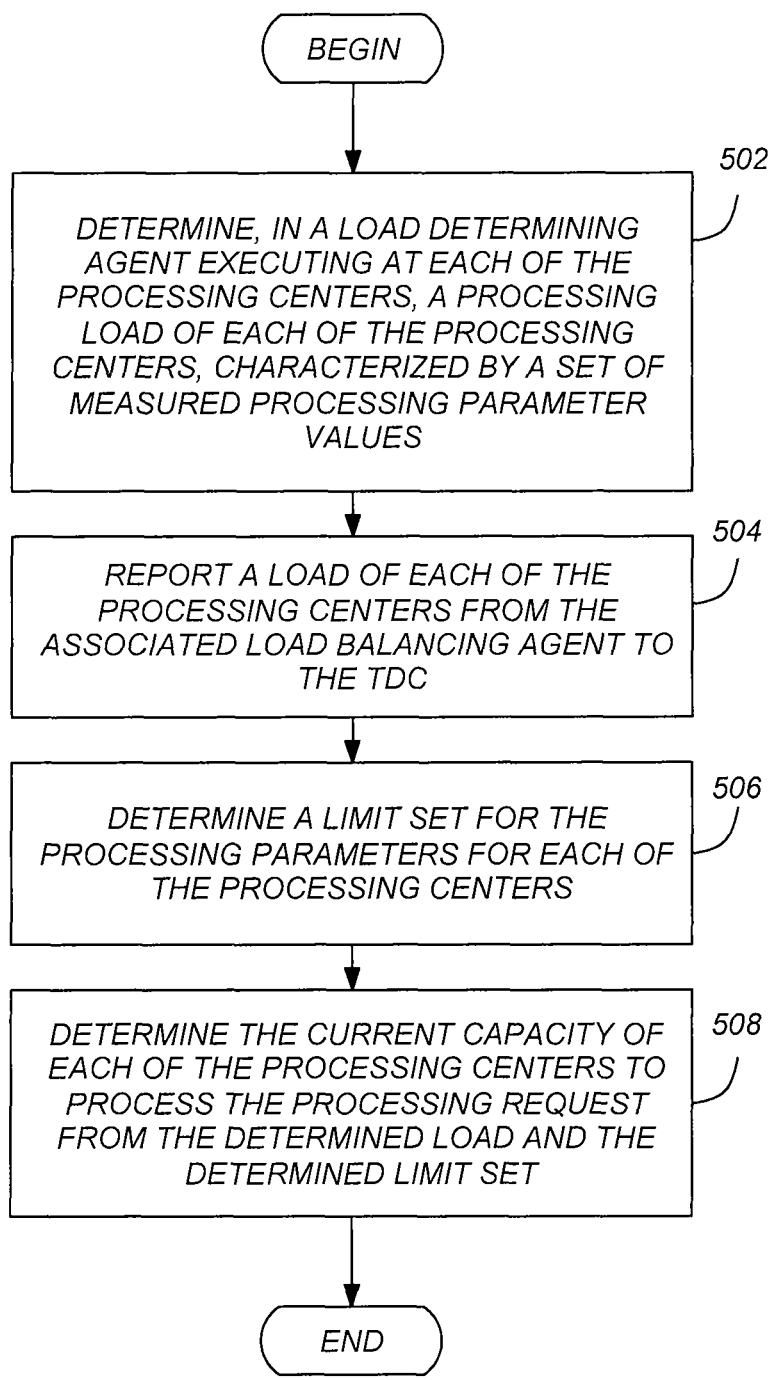
FIG. 5 is a flow diagram illustrating an example embodiment of a process to determine the capacity of the processing centers to respond to client processing requests.

FIG. 5 is a diagram illustrating an example embodiment of a process to determine the capacity of the processing centers (132, 134) to respond to client processing requests. A processing load of each of the processing centers (132, 134) is determined, as shown in block 502. The processing load may be characterized by a set of one or more measured values 304(A-E) of processing parameters 302(A-E), such as any combination of those described above. The determined load 304(A-E) is reported to the TDC 202 of the first processing center 132, as shown in block 504. In one embodiment, the operations of block 502 and 504 are performed by the LDA 208 associated with the second processing center 134 of interest. A limit, represented by a set of one or more threshold values 306(A-E), is determined for each of the processing centers, as shown in block 506. Of course, the limit set may be determined in advance or after the load is identified in block 502. Further, the limit set may change with time or may change based upon other parameters. The capacity of each of the second processing centers 134 is then determined by comparing the measured values (304A-304E) of a processing center's respective load against the corresponding threshold values (306A-306E) of the specified limit set, as shown in block 508.

As an example, suppose that in response to a health check request (which may be periodic, aperiodic or performed in response to a client processing request) from the TDC 202 or elsewhere, the LDA 208 reports the following for a processing center 134:

Current Capacity=30%;

Concurrency=90,000; and

Latency=50 ms.

In this case, the current LOAD for the site is—[30%; 90,000; 50 ms]. Further suppose that the LIMIT for this site were defined as: [90%; 100,000; 40 ms]. The current health indicates that the current LOAD for the processing center 134 has higher application latency than the defined limit; the processing center 134 may be designated as no longer 'healthy'. Higher application latency results in poor application performance, and so, the traffic for that application might be better served by sending it to a different processing center 134.

Exemplary TDC Resource Allocation

Let "$l_i$" be the specified threshold value of the LIMIT set for processing parameter "i". Let 'n' be the total number of processing parameters considered for TDC (202) to make traffic decisions. Then, the complete set of LIMITs (=I) will be:

LIMIT set=$I=[l_1,l_2,l_3,\ldots,l_n]$

Let "$x_i$" be the current status (i.e., measured/computed value) of the processing parameter 'i'. Then, for a generic processing center 134, the current LOAD (=L) will be:

LOAD=$L=[x_1,x_2,x_3,\ldots,x_n]$

In a paradigm with health criteria that requires every measured processing parameter value of the processing center 134 to be under the limit to qualify as "healthy," health can be defined such that for each and every "i," $x_i <$(or $\leq$) $l_i$. Alternatively, some processing parameters may be defined such that the threshold value represents a desired lower limit rather than a desired upper limit for a given processing parameter. For example, if $x_1$ represents "number of concurrent connections," then the better value for $x_1$ is anything that satisfies:

$x_1 < l_1$(or $x_1 \leq l_1$)

And if $x_2$ represents "available capacity," then a better value for $x_2$ is anything that satisfies:

$x_2 > l_2$(or $x_2 \geq l_2$)

In another paradigm, health criteria may be defined such that instead of verifying that every processing parameter "i" satisfies the above condition, a combination of processing parameters i, j, k, etc. could be used such that even if one or more of the measured processing parameter values are no longer better than the respective limit values, the processing center 134 can still be considered healthy. For example, health criteria may be defined in which a processing center 134 is only considered unhealthy if all the measured values of a particular subset of processing parameters (e.g., i, j, and k) are at the limit values or worse.

For example, if $x_3$ represents "latency" and $x_4$ represents "application response time," the following conditions may still qualify the processing center 134 as "healthy":

$[x_3 > l_3; x_4 < l_4]$

This may make sense if the client 110 is at a geographical distance from the nearest processing center such that the measured latency cannot be better than the limit. This may still lead to the best possible performance for the client at that distance. For example, if a client is physically located so far away that the closest processing center to it has a latency greater than the limit defined for that site. In this case, nothing can be done to significantly reduce that latency as it is a function of the client's physical distance from the processing center, and the load value may be more than the limit value; however, it may still be advantageous to route the processing request to that processing center because other more distant processing centers would result in even greater latency. Also note that latency can also be determined by measuring how long it takes a client to respond to a request from the server application 222 at the processing center 134, and latency may be high because the client is using a slower device which takes longer to process requests or has a slower internet connection.

Or, the following condition may be used to define the processing center 134 as "healthy":

$[x_3 < l_3; x_4 > l_4]$

This health criteria may be useful if a certain application 222 requires an additional delay which cannot be avoided. As long as the latency to the client 110 is still less than the limit, this criteria may still lead to the best possible performance for the client for that the client processing request invoking that application.

However, if the following situation arises, the site may then be classified as "unhealthy":

$[x_3 > l_3; x_4 > l_4]$

In this case, both client latency and application response time are worse than the predefined limit values, and in this case, the processing center 134 may be simply classified as "unhealthy."

Therefore, processing centers 134A-134C (X, Y and Z) may be either "healthy" or "unhealthy." How we classify a processing center 134, say 134A ("X") as "unhealthy" depends on its current LOAD values $x_1, x_2, \ldots, x_n$ and how they compare with LIMIT values $l_1, l_2, \ldots, l_n$.

Let "G" be a TDC Decision Pool such that only sites which are "healthy" can be added to the pool. Assuming that processing center 134A ("X") is "unhealthy," but processing centers 134B and 134C ("Y" and "Z") are "healthy," the TDC 202 decision pool is:

$$G=[Y,Z].$$

As long as there are data processing centers 134 still in the TDC 202 decision pool (G), TDC 202 will make decisions how to serve an incoming new client processing request. The TDC 202 controls the flow of traffic by manipulating DNS responses to a client's processing requests, so that these DNS responses represent one of the sites in the TDC 202 decision pool (G). The TDC 202 decision pool G also includes the 3rd Party POP sites and other data centers irrespective of the vendors used to implement local server load balancing (SLB) operations at these sites.

Figure 6:
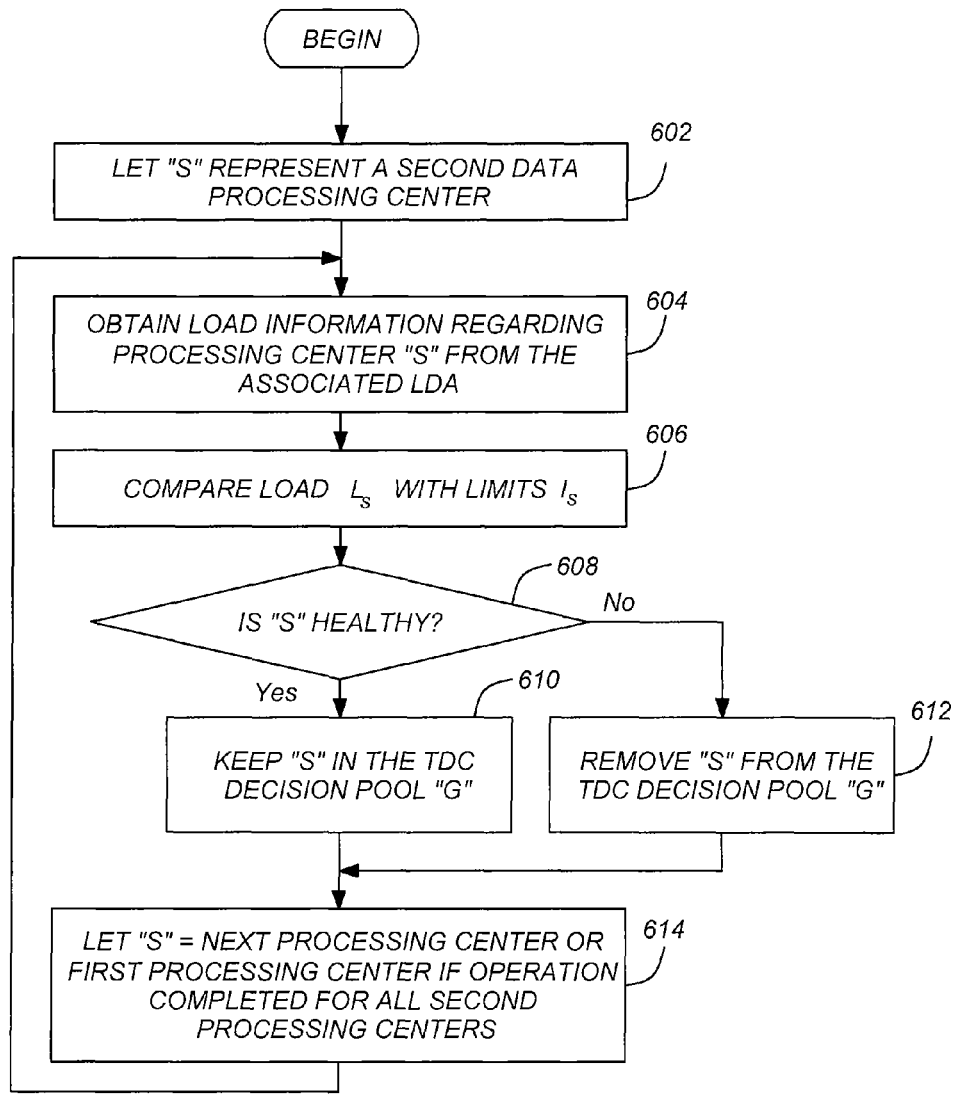
FIG. 6 is a flow diagram further illustrating the determination of the capacity of the processing centers in accordance with an example embodiment.

FIG. 6 is a diagram further illustrating the foregoing process. In block 602, the initial processing center 134 to be evaluated (e.g., as "healthy" or "unhealthy") is represented. Load information is obtained regarding the processing center 134 from the LDA 208 associated with the processor center 134, as shown in block 604. The load data (i.e., the set of measured processing parameter values) is compared with the limit set for the processing center 134 under consideration, as shown in block 606. In block 608, the foregoing comparison is used to determine if the processing center 134 is healthy. If the processing center is healthy, it is kept in the decision pool G, but if it is unhealthy, it is removed from the decision pool G, as shown in blocks 610 and 612. Finally, block 614 increments to the next processing center to be evaluated and the process flow is returned to block 604.

Figure 7:
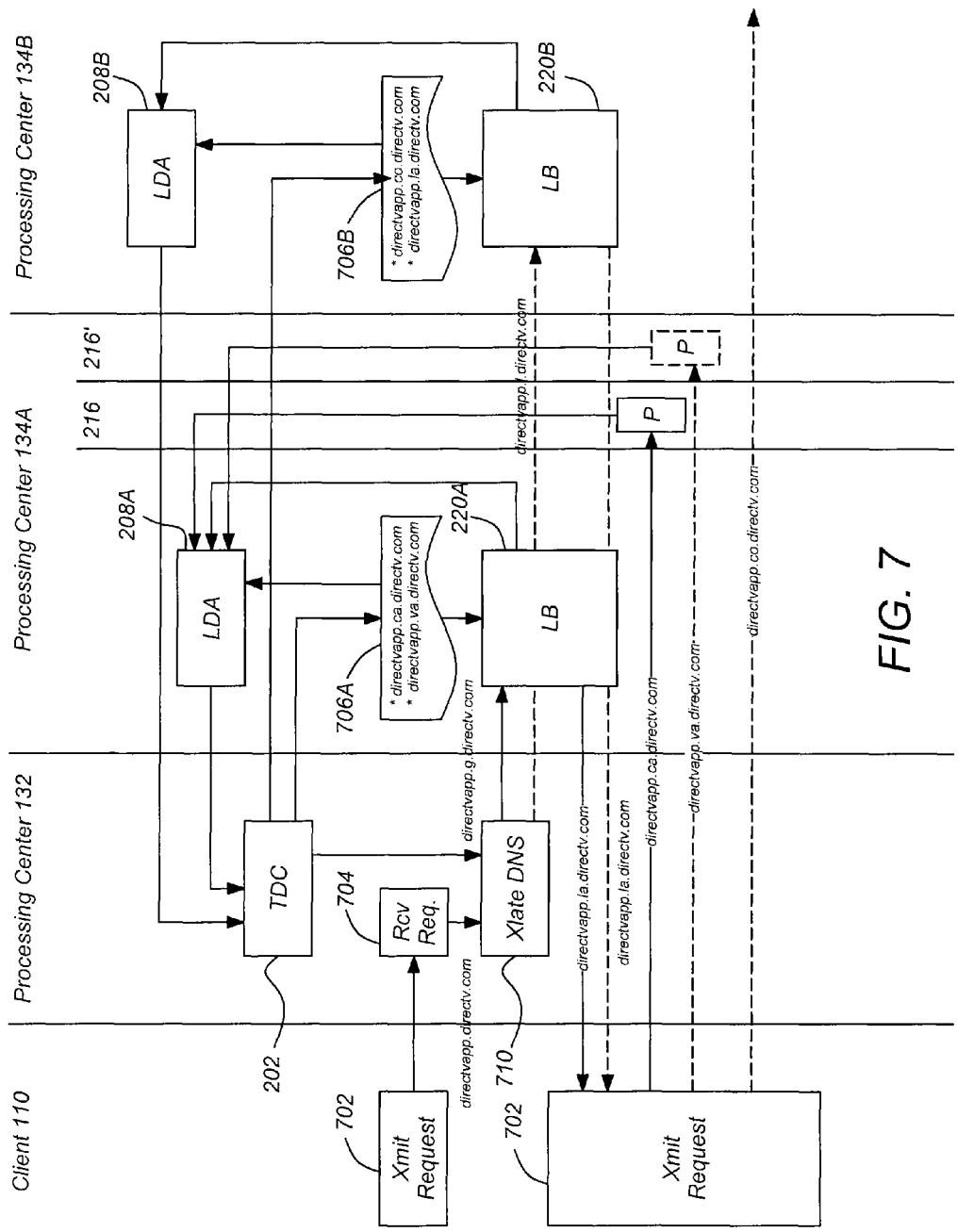
FIG. 7 is a diagram illustrating a process flow between the processing centers in an example embodiment.

FIG. 7 is a diagram illustrating an example process flow between the client and processing centers in one embodiment. A processing request is addressed to a first global address and transmitted from the client 110 to the first processing center 132. In one embodiment, the global address is a CNAME record for the domain name directvapp.directv.com, and the processing request comprises input data. CNAMES are domain name aliases. They are used to allow computers on the Internet to perform multiple roles, such as a web-server, ftp server, chat server, etc. To mask this operation, CNAMES can be used to give a single processor multiple names, or aliases. For example, a computer at the following domain name "computer1.xyz.com" may be both a web-server and an ftp-server, so two CNAME-records are defined to include "www.xyz.com"="computer1.xyz.com" and "ftp.xyz.com"="computer1.xyz.com." Also, a single server computer may host many different domain names (for example, through different ISPs), and so CNAME-records may be defined such as "www.abc.com"="www.xyz.com".

The first processing center 132 receives the processing request, as shown in block 704. The first processing center then translates or readdresses the address from the first global address point to a second global address. In the illustrated embodiment, the translator 710 readdresses the processing request from "directvapp.directv.com" to "directvapp.g.directv.com," to indicate that the processing request is to be readdressed or assigned to the processing center 134A associated with the domain name "directvapp.g.directv.com" for processing.

As described above, physical load balancers (LBs) 220A and 220B in the second data processing centers 134A and 134B handle traffic within each respective processing center. The LBs 220A and 220B (also known as Global Server Load Balancers or GSLBs) are another layer which sits in front of the domain name service (as a part of the load balancer hardware). The processing capabilities and the horsepower offered by the LBs 220A and 220B may add additional functionality, even if the LBs 220A and 220B are from different vendors with different interfaces and protocols.

The LBs (220A, 220B) and the processors provide information to the respective LDAs (208A, 208B) regarding the processing load and assignment of processing requests to the processors. Further, information may be provided from the processors (216, 216') to the LDA 208A directly or through another path (e.g. operating system software of the processing center 134A).

As described further below, each LB (220A, 220B) may maintain processor assignment information (706A, 706B), such as an available processor address list, that the LB (220A, 220B) uses to assign processing tasks to processors. For example, if the processing center 134A includes two processors 216 and 216' and the address of processor 216 is "directvapp.ca.directv.com" and the address of processor 216' is "directvapp.va.directv.com," the LB 220A may assign processing tasks to any processor in the available processor address list, in the above example, processors 216 and 216' at addresses "directvapp.ca.directv.com" and "directvapp.va.directv.com," respectively. If one of the processors 216 is no longer capable of processing further requests or if it is preferred that further requests be directed elsewhere, the address of that processor may be remove from the list. Until the processor 216 becomes capable of accepting new requests, it remains absent from the list. Other embodiments are also possible wherein all processors within or controlled by the processing center (134A, 134B) are always on the list, but other annotations are made to allocate processing tasks or indicate availability. For example, the information 706 may indicate that directvapp.ca.directv.com is to accept 70% of processing requests, while directvapp.va.directv.com is to accept 30% of such tasks. In this case, the allocation by percentage may be modified, or the allocation to directvapp.ca.directv.com may be changed to 100% and the allocation to directvapp.va.directv.com may be changed to 0% to implement the same result. The processor assignment information may also be provided to the TDC 202, either directly, or through the LDA (208A, 208B).

The LDA (208A, 208B) collects this information and forwards it to the TDC 202, which uses this information to determine the capacity of each of the processing centers (134A, 134B) to respond to the incoming client processing request 702, and to define CNAMES in the DNS translator. Accordingly, since the processing center capacity is provided to the TDC 202 via the LDAs (208A, 208B) and the TDC 202 may change the address translator 710 (or CNAME definitions), the TDC 202 thereby allocates client processing requests to processing centers 134A and 134B based upon the capacity of the processing center. For example, if the load data gathered by LDA 208A and sent to the TDC 202 indicates that the processing capacity of processing center 134A is such that it is not the best choice (or even not a choice at all) to service an incoming client processing request, the TDC 202 may update the CNAME definitions such that the client processing request addressed to "directvapp.directv.com" is redirected to "directvapp.1.directv.com," which is the address for processing center 134B, as shown in the dashed line from translator 710 of FIG. 7.

FIG. 7 also illustrates another example embodiment in which the TDC 202 can control allocation of processing tasks to the processors (216, 216') operating within the processing center 134A and under the LB's (220A) control. In this embodiment, the LB 220A maintains processor assignment information 706A that is used to allocate processing requests received by the processing center 134A to the processors (216, 216') under its control. This information is made available to the TDC 202 either implicitly (e.g. the TDC 202 generates this information and transmits it to the LB 220A, hence the TDC 202 implicitly knows the processor assignment information) or explicitly, either directly or via the LDA 208A. In either case, the TDC 202 is aware of the global address (in the illustrated example, the domain name) of the processors. Since each second processing center (134A, 134B) assigns processing tasks to one or more of its related processors (216, 216') according to the processor assignment information (706A, 706B), the TDC 202 can control how the LB 220A assigns processing requests to each processor (216, 216') within the processing center 134A by controlling the content of the processor assignment information. By suitable modification of the processor assignment information, the TDC 202 may, for example, remove a processor 216 from consideration, so that the LB 220A no longer assigns processing requests to that processor 216. Or, the TDC 202 may alter the allocation of processing requests (e.g. changing from 70-30% to 60-40% for example).

For example, if the TDC 202 determines that the capacity of processor 216 to accept a received processing request from the client 110 is significantly lower than the capacity of processor 216', the TDC 202 may alter the processor assignment information 706A associated with processing center 134A to remove the address associated with processor 216 ("directvapp.ca.directv.com"). Since the address of that processor 216 is no longer on the processor assignment information (in this case, a list), when the TDC routes the client processing request to "directvapp.g.directv.com," the LB 220A will attempt to load balance the new processing request and assign it to one of the processors defined in the processor assignment information list. Since in our example, that list now excludes all processors except processor 216' (with the address of "directvapp.va.directv.com"), when the processing center 134A receives the processing request addressed to "directvapp.g.directv.com," the LB 220A will allocate that processing request to the processor at the address "directvapp.va.directv.com," that is, processor 216' (instead of the processor 216 that may ordinarily have been assigned to respond to the client's processing request). This domain name is transmitted from the LB 220A to the client 110, and accordingly, the client processing request 702 is redirected to processor 216' associated with the "directvapp.va.directv.com" address (as shown by a dashed line in FIG. 7).

Therefore, by suitable modification or control of the address translation 710, the TDC 202 can assign any incoming processing request to any processor center 134, and by judicious control of the processor assignment information 706, the TDC 202 can direct that processing task to any processor (216, 216') within the selected processing center. This capability and the use of the LDAs (208A, 208B) allows the TDC 202 to extend the management capabilities and load balancing offered at each processing center 134 to the global system that includes the first processing center 132. Importantly, since this is accomplished by use of global addresses that can be managed and changed remotely, this can be implemented without need to consider detailed processing center 134 data or protocol requirements.

Although FIG. 7 illustrates entities referring and redirecting requests and information according to domain names alone for purposes of simplicity, the process also may involve transmission of the domain name to a domain name server (DNS), which translates the domain name into an internet protocol (IP) address. The DNS may contact other DNSs to determine the IP address for the specified domain name.

Although the foregoing is described with respect to a system that comprises a TDC 202 and LDAs (208A, 208B) executing at each of the second processing centers (134A, 134B), the system may be implemented with an LDA 204 disposed at the first processing center 132, and the TDC 202 may be implemented in one or more of the second processing centers (134A, 134B). Further, the TDCs (202, 206A-C) and/or LDAs (204, 208A-C) may be implemented separately from the first and second processing centers (132, 134A-C) if desired, and need not be disposed in the same location as the related processing center. Also, although the foregoing illustrates the client processing request being received at the first processing center 132, client processing requests may be received at any of the second processing centers (134A-C) as well. For that matter, at least some functional allocation between the elements described above may be relocated as desired.

Hardware Environment

Figure 8:
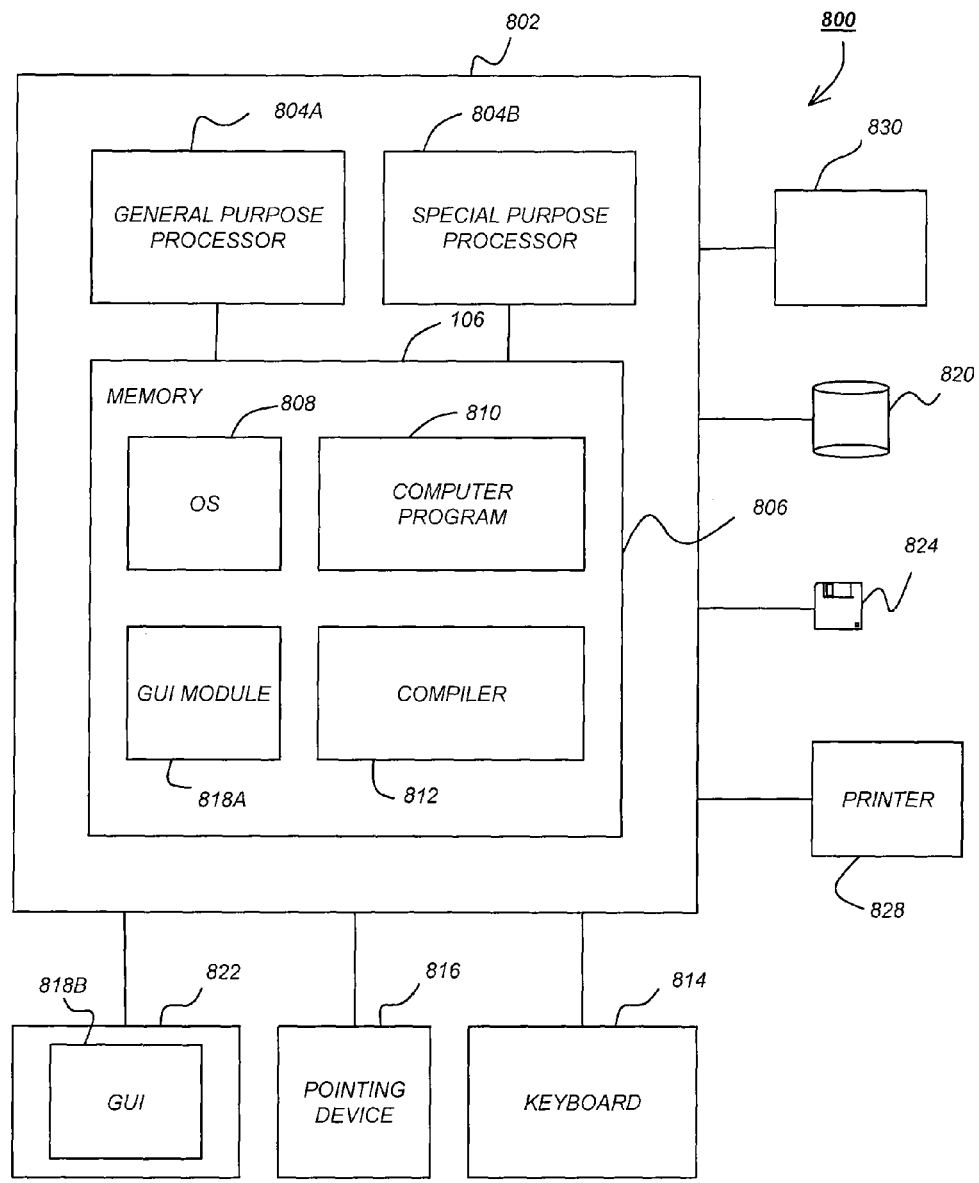
FIG. 8 is a diagram illustrating an example embodiment of a computer system.

FIG. 8 is a diagram illustrating an exemplary computer system 800 that could be used to implement elements of an embodiment, including first processing center 132, the second processing centers 134(A-C), the processors 216 or any processor operating in the processing centers 132, 134A-C, and/or the client 110. The computer 802 comprises a general purpose hardware processor 804A and/or a special purpose hardware processor 804B (hereinafter alternatively collectively referred to as processor 804) and a memory 806, such as random access memory (RAM). The computer 802 may be coupled to other devices, including input/output (I/O) devices such as a keyboard 814, a mouse device 816 and a printer 828.

In one embodiment, the computer 802 operates by the general purpose processor 804A performing instructions defined by the computer program 810 under control of an operating system 808. The computer program 810 and/or the operating system 808 may be stored in the memory 806 and may interface with the user and/or other devices to accept input and commands and, based on such input and commands and the instructions defined by the computer program 810 and operating system 808 to provide output and results.

Output/results may be presented on the display 822 or provided to another device for presentation or further processing or action. In one embodiment, the display 822 comprises a liquid crystal display (LCD) having a plurality of separately addressable pixels formed by liquid crystals. Each pixel of the display 822 changes to an opaque or translucent state to form a part of the image on the display in response to the data or information generated by the processor 804 from the application of the instructions of the computer program 810 and/or operating system 808 to the input and commands. Other display 822 types also include picture elements that change state in order to create the image presented on the display 822. The image may be provided through a graphical user interface (GUI) module 818A. Although the GUI module 818A is depicted as a separate module, the instructions performing the GUI functions can be resident or distributed in the operating system 808, the computer program 810, or implemented with special purpose memory and processors.

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement an embodiment. Further, the special purpose processor 804B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 802 may also implement a compiler 812 which allows an application program 810 written in a programming language such as COBOL, C++, FORTRAN, or other language to be translated into processor 804 readable code. After completion, the application or computer program 810 accesses and manipulates data accepted from I/O devices and stored in the memory 806 of the computer 802 using the relationships and logic that was generated using the compiler 812.

The computer 802 also optionally comprises an external communication device such as a modem, satellite link, Ethernet card, or other device for accepting input from and providing output to other computers.

In one embodiment, instructions implementing the operating system 808, the computer program 810, and/or the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, or a flash drive. Further, the operating system 808 and the computer program 810 are comprised of computer program instructions which, when accessed, read and executed by the computer 802, causes the computer 802 to perform the steps necessary to implement and/or use the apparatus and methods disclosed herein or to load the program of instructions into a memory, thus creating a special purpose data structure causing the computer to operate as a specially programmed computer executing the method steps described herein. Computer program 810 and/or operating instructions may also be tangibly embodied in memory 806 and/or data communications devices 830, thereby making a computer program product or article of manufacture. As such, the terms "article of manufacture," "program storage device" and "computer program product" or "computer readable storage device" as used herein are intended to encompass a computer program accessible from any tangible computer-readable device or media.

Of course, those skilled in the art will recognize that any combination of the above components, or any number of different components, peripherals, and other devices, may be used with the computer 802.

Although the term "computer" is referred to herein, it is understood that the computer may include portable devices notebook computers, pocket computers, cell phones, tablet computers, or any other device with suitable processing, communication, and input/output capability.

The foregoing description of example embodiments has been presented for the purposes of illustration and description. It is not intended to be exhaustive or limiting in scope to the precise form disclosed. Many modifications and variations are possible in light of the above teachings.

What is claimed is:

1. In a processing system comprising a first processing center and one or more second processing centers remote from the first processing center, each of the second processing centers comprising at least one associated second processing center processor, a method of assigning a processing request, comprising:
   determining, at a traffic distribution controller of the first processing center, a capacity of each of the second processing centers to process the processing request, including determining a current capacity of each second processing center processor to process the processing request;
   receiving the processing request from a client in the first processing center; and
   assigning the processing request to at least one second processing center processor according to the determined current capacity of the at least one of the second processing center processor, comprising;
      commanding, by the traffic distribution controller, a modification of processor assignment information of the second processing center associated with the assigned at least one second processing center processor according to the determined capacity of each processor of the second processing center to process the processing request;
   wherein a global address of the assigned at least one second processing center processor is transmitted from the second processing center associated with the assigned at least one second processing center processor to the client, and the at least one second processing center processor receives the processing request from the client at the global address of the at least one second processing center processor.

2. The method of claim 1, wherein:
   the processing request is addressed to a first global address comprising a first canonical name (CNAME) of a domain; and
   assigning the processing request comprises readdressing the processing request from the first global address to the global address of the assigned at least one second processing center processor, wherein the global address of the assigned at least one second processing center processor comprises a second domain name.

3. The method of claim 1, wherein the step of determining the current capacity of each of the second processing centers comprises the steps of:
   determining, in a load determining agent (LDA) executing at each of the second processing centers, the processing load of each of the processing centers, wherein the load comprises a set of one or more measured values respectively associated with one or more processing parameters;
   reporting the load of each of the second processing centers from each respective load determining agent to the traffic distribution controller;
   determining, in the traffic distribution controller, a limit comprising a set of one or more threshold values corresponding to the one or more processing parameters; and
   determining, in the traffic distribution controller, the current capacity of each of the second processing centers to process the processing request based on a comparison of the limit and the reported load of each of the second processing centers.

4. The method of claim 3, wherein the one or more processing parameters include:
a number of clients currently serviced by the second processing center;
bandwidth utilization of the second processing center;
memory utilization of the second processing center; and
processing utilization of the second processing center.

5. The method of claim 3, wherein:
each of the second processing centers are executing one or more applications; and
the one or more processing parameters include a response latency of at least one of the one or more executing applications.

6. The method of claim 5, wherein at least one of the measured values of the one or more processing parameters are determined by performing steps comprising:
polling the executing applications in each of the second processing centers; and
generating the processing load of each of the second processing centers from the polled executing applications.

7. The method of claim 5:
wherein the response latency is measured by performing steps comprising:
transmitting a test request to the at least one of the one or more executing applications;
measuring a time required for the at least one of the one or more executing applications to respond to the transmitted test request;
wherein the number of connections is measured by performing steps comprising:
establishing a secure remote login to the second processing center; and
reading the number of clients currently serviced by the second processing center;
wherein the second processing center includes network devices, and the bandwidth utilization of the processing center is measured by performing steps comprising:
monitoring network equipment used at the second processing center;
wherein the memory utilization of the second processing center is measured by performing steps comprising:
establishing a secure remote login to the second processing center; and
reading memory utilization of the second processing center;
wherein processing utilization of the second processing center is measured by performing steps comprising:
establishing a secure remote login to the second processing center; and
reading the processing utilization of the second processing center.

8. The method of claim 1, wherein each of the plurality of second processing centers are third-party vendor point of presence (POP) processing centers commercially distinct from the first processing center and contracted to accept and process the processing request for the first processing center.

9. The method of claim 1, wherein:
the processor assignment information comprises at least one second processing center processor domain name; and
the processor assignment information is modified to remove or add the at least one second processing center processor domain name according to the current capacity of each second processing center processor.

10. A processing system comprising:
a first processing center, for accepting a processing request from a client;
one or more second processing centers remote from the first processing center, each of the second processing centers comprising an associated second processing center processor; and
a traffic distribution controller, disposed external to the one or more second processing centers, for determining a capacity of each of the second processing centers to process the processing request, including determining a current capacity of each second processing center processor associated with each second processing center to process the processing request and for assigning the processing request to at least one second processing center processor according to the determined current capacity of the second processing center processor associated with each of the second processing centers, by commanding a modification of processor assignment information of the second processing center associated with the assigned at least one second processing center processor according to the determined current capacity of the assigned at least one second processing center processor to process the processing request;
wherein a global address of the assigned at least one second processing center processor is transmitted from second processing center associated with the assigned at least one second processing center processor to the client, and the at least one second processing center processor receives the processing request from the client at the global address of the at least one second processing center processor.

11. The processing system of claim 10, wherein:
the processing request is addressed to a first global address comprising a first canonical name (CNAME) of a domain; and
the processing request is assigned by readdressing the processing request from the first global address to the global address of the assigned at least one second processing center processor, wherein the global address of the assigned at least one second processing center processors comprises a second domain name.

12. The processing system of claim 10, wherein:
the processing system further comprises a load determining agent, executing at each of the second processing centers, for determining the processing load of each of the second processing centers, wherein the load comprises a plurality of measured values of respective processing parameters, and for reporting the load of each of the second processing centers from the associated load determining agent to the traffic distribution controller; and
the traffic distribution controller further determines a limit set comprising threshold values for each of the processing parameters and determines the current capacity of each of the second processing centers to process the processing request from the limit set and the reported load for each of the second processing centers.

13. The processing system of claim 12, wherein the one or more processing parameters include:
a number of clients currently serviced by the second processing center;
bandwidth utilization of the second processing center;
memory utilization of the second processing center; and
processing utilization of the second processing center.

14. The processing system of claim 12, wherein:
each of the second processing centers are executing one or more applications; and the one or more processing parameters include a response latency of at least one of the one or more executing applications.

15. The processing system of claim 14, wherein the load determining agent comprises a module for determining at least one of the measured values of the processing parameters, the module including:
a monitoring module for polling the executing applications in each of the second processing centers; and
a processing load module for generating the processing load of each of the second processing centers from the polled executing applications.

16. The processing system of claim 15, wherein:
the monitoring module transmits a test request to the at least one of the one or more executing applications; and
the processing load module measures a time required for the at least one of the one or more executing applications to respond to the transmitted test request.

17. The processing system of claim 15, wherein the monitoring module establishes a secure remote login to the second processing center and reads the number of clients currently serviced by the processing center.

18. The processing system of claim 15, wherein the monitoring module monitors a network device used at the second processing center.

19. The processing system of claim 15, wherein the monitoring module establishes a secure remote login to the processing center and reads memory utilization of the second processing center.

20. The processing system of claim 15, wherein the monitoring module establishes a secure remote login to the second processing center and reads the processing utilization of the processing center.

21. The processing system of claim 10, wherein each of the plurality of second processing centers are third-party vendor point of presence (POP) processing centers commercially distinct from the first processing center and contracted to accept and process processing requests for the first processing center.

22. The processing system of claim 10, wherein:
the processor assignment information comprises at least one second processing center processor domain name, and processor assignment information is modified to remove or add the at least one second processing center processor domain name of according to the current capacity of each second processing center processor.

* * * * *